(12) United States Patent
Malmberg

(10) Patent No.: US 9,272,286 B2
(45) Date of Patent: Mar. 1, 2016

(54) WEAR ELEMENT SYSTEM

(71) Applicant: SANDVIK INTELLECTUAL PROPERTY AB, Sandviken (SE)

(72) Inventor: Mats Malmberg, Rydsgard (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 0 days.

(21) Appl. No.: 14/388,356

(22) PCT Filed: Mar. 18, 2013

(86) PCT No.: PCT/EP2013/055542
§ 371 (c)(1),
(2) Date: Sep. 26, 2014

(87) PCT Pub. No.: WO2013/143900
PCT Pub. Date: Oct. 3, 2013

(65) Prior Publication Data
US 2015/0056402 A1    Feb. 26, 2015

(30) Foreign Application Priority Data

Mar. 27, 2012 (EP) .................. 12161389

(51) Int. Cl.
*B02C 17/22* (2006.01)
*B65G 11/16* (2006.01)

(52) U.S. Cl.
CPC .............. *B02C 17/22* (2013.01); *B02C 17/225* (2013.01); *B65G 11/166* (2013.01); *B02C 2210/02* (2013.01); *Y10T 428/24008* (2015.01)

(58) Field of Classification Search
CPC .............................. B02C 17/22; B02C 17/225
USPC ........................... 428/44, 45, 49; 52/386, 384
See application file for complete search history.

(56) References Cited

FOREIGN PATENT DOCUMENTS

| GB | 2218653 A | 11/1989 |
|---|---|---|
| SE | 308058 B | 1/1969 |
| WO | 2011012629 A1 | 2/2011 |

*Primary Examiner* — Alexander Thomas
(74) *Attorney, Agent, or Firm* — Corinne R. Gorski

(57) ABSTRACT

A wear element system, primarily for rock, stone and gravel handling equipment. includes a plurality of wear elements received in support rails. The support rails being fastened to surfaces of the equipment. Side edges of two adjacent wear elements are received in one of the support rails. The wear elements and support rails are shaped to fasten the wear elements in the support rails by means of wedge elements. The wedge elements are pushed down between the wear elements inside the support rails.

16 Claims, 3 Drawing Sheets

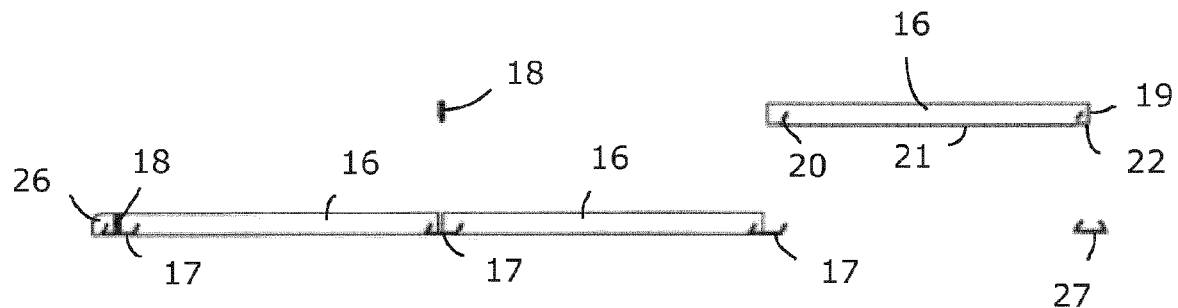
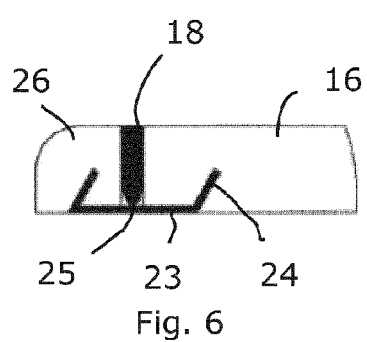
Fig. 6
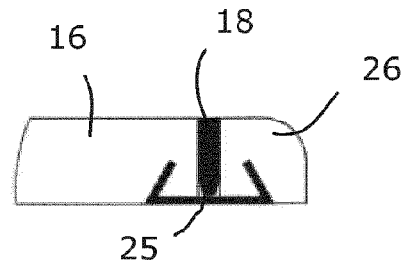
Fig. 7
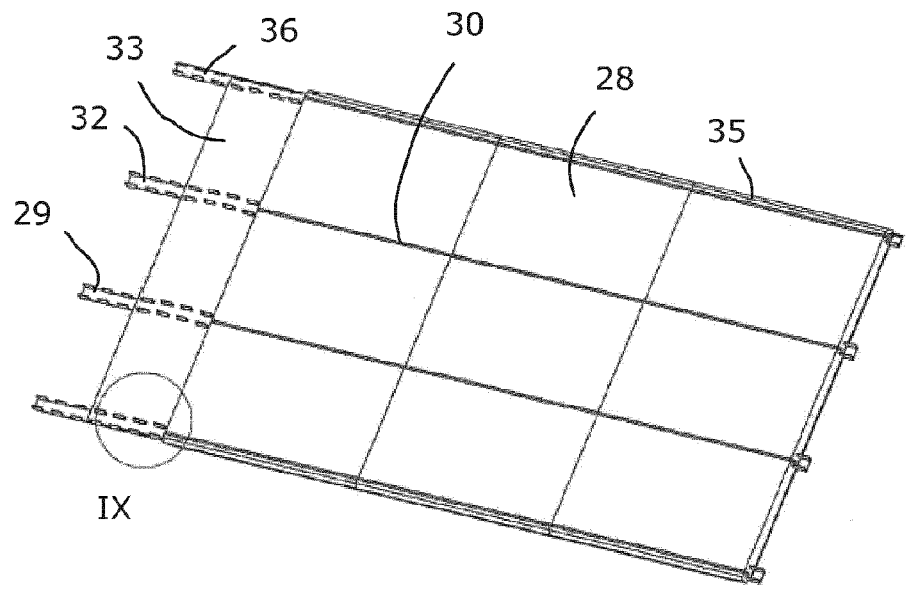
Fig. 8

WEAR ELEMENT SYSTEM

RELATED APPLICATION DATA

This application is a §371 National Stage Application of PCT International Application No. PCT/EP2013/055542 filed Mar. 18, 2013 claiming priority of EP Application No. 12161389.7, filed Mar. 27, 2012.

TECHNICAL FIELD

The present invention concerns a wear element system, primarily for rock, stone and gravel handling equipment. Examples of such rock, stone and gravel handling equipment are crushers, screens, feeders, hoppers and chutes.

PRIOR ART

Different equipments used in crushing and screening of rocks, stones and gravel are subjected to wear, for instance by impact of the rocks, stones and gravel to be handled. To protect the most exposed parts it is common to place special wear elements on these parts. Thereby, it is possible to replace only the wear elements when needed, without having to replace or repair parts of the equipment as such.

WO 2011/012629 discloses one example of protective lining for walls of mills, mixers, hoppers and other machines. A panel is connected to profiles on a wall. Said panel has seats for a number of protective inserts snapped onto the seats of the panel. GB 2218653 discloses mill linings elements secured to an internal surface of the mill by means of steel bars welded to the internal surface.

The wear elements are normally adapted to one particular use in one particular kind of equipment. The wear elements are fastened to the equipment in many different ways, depending on the intended use.

SUMMARY

One object of the present invention is to provide a wear element system that may be used in many different types of rock, stone and gravel processing equipments, such as crushers, screens, feeders, hoppers and chutes. The wear element system should be relatively easy to install. Furthermore, the wear elements should be easy to replace when worn, with the use of a minimal set of tools, if any. The wear elements should be possible to replace on site and it is beneficial if it is possible to replace a separate wear element without having to lift other wear elements.

These objects have been achieved by the technique having the features set forth in the appended independent claim. Preferred embodiments are defined in the dependent claims.

According to the present invention a wear element system is provided having relatively few parts that may be standardized and combined in different ways depending on the intended use and the design of the equipment to receive the wear element system.

The wear elements may be made of a relatively elastic material, such as rubber or some polymeric materials, or a relatively hard material, such as metallic or some polymeric materials. A soft material may be chosen if relatively many and/or heavy impacts are expected, as a soft material will absorb much of the energy at impact. A hard material is often chosen for parts exposed to frictional wear from the handled material.

Further objects and advantages of the present invention will be obvious to a person skilled in the art, when reading the detailed description below of embodiments of the present invention.

BRIEF DESCRIPTION OF THE DRAWINGS

The invention will be described further below by way of examples and with reference to the enclosed drawings. In the drawings:

FIG. 5 is a side view illustrating mounting of a second embodiment of a wear element and a second embodiment of a support rail;

FIG. 6 is a side view of one edge of a set of wear elements according to FIG. 5;

FIG. 7 is a side view of an opposite edge compared to FIG. 5, of the set of wear elements;

FIG. 8 is a perspective view of a set of mounted wear elements according to a third embodiment and using a third embodiment of a support rail;

DETAILED DESCRIPTIONS OF EMBODIMENTS

As used in this description expressions such as "upper", "lower" and the like are normally in view of the Figs. referred to and do not have to reflect placement in actual use.

Figure 1:
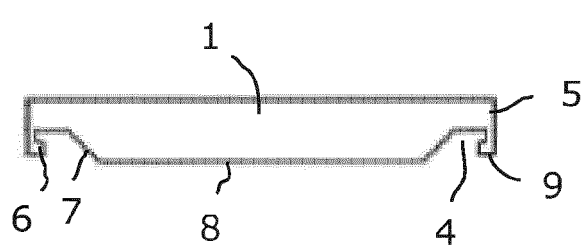
FIG. 1 is a side view of a first embodiment of a wear element according to the present invention.
Figure 4:
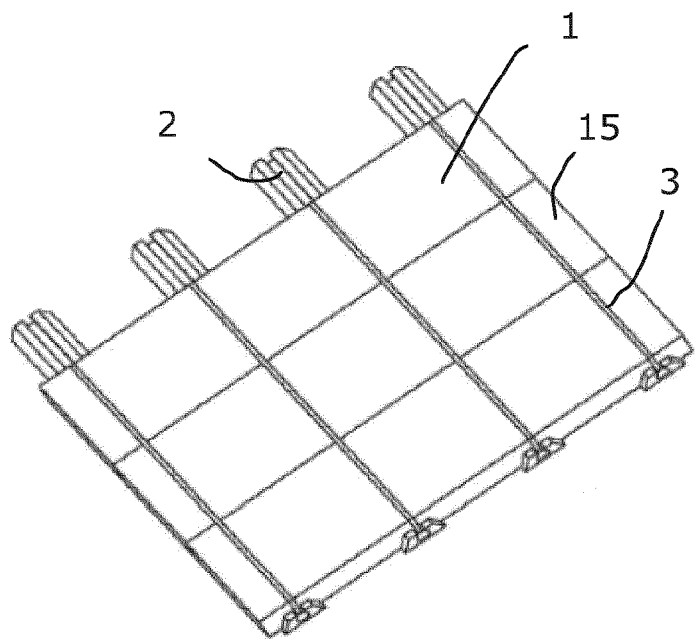
FIG. 4 is a perspective view of a number of mounted wear elements.
Figure 9:
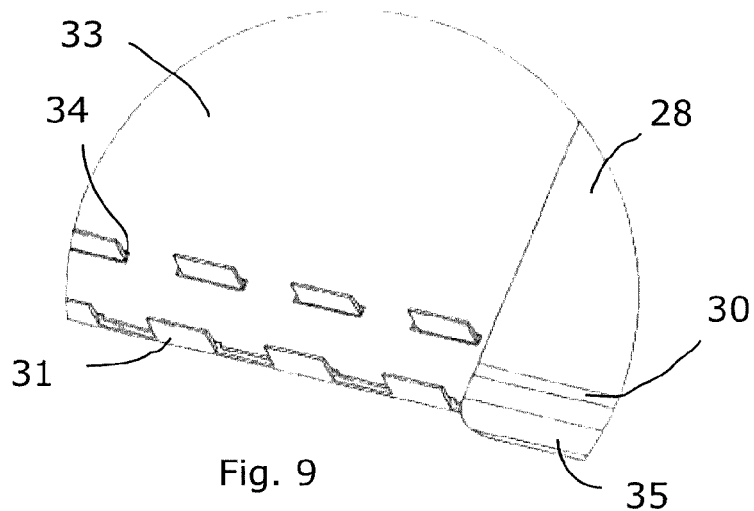
FIG. 9 is a detailed view of the encircled part marked IX of FIG. 8.
Figure 10:
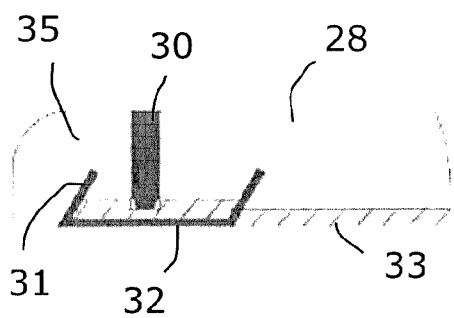
FIG. 10 is a side view of one edge of the set of mounted wear elements of FIG. 8.
Figure 11:
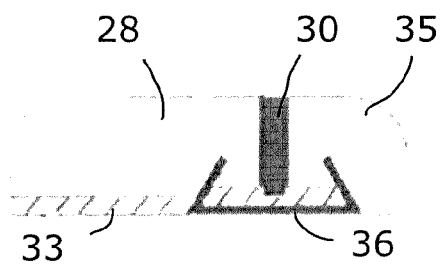
FIG. 11 is a side view of an opposite edge compared to FIG. 10, of the set of mounted wear elements of FIG. 8.

In FIG. 1 a first embodiment of a wear element 1 according to the present invention is shown. The wear element 1 is shown in FIG. 4 as having a general rectangular shape in plan view. In other embodiments the wear elements have other and varying shapes, depending on the equipment to receive the wear elements. A number of wear elements 1 is to be mounted to rock, stone and gravel handling equipment by means of support rails 2 and wedge elements 3. The method of installation of the wear elements 1 will be discussed further below. At two opposite sides of each wear element 1 a groove 4 is formed, which grooves 4 are placed shortly from a respective side edge 5 of the wear element 1. A protruding part 6 at the lower edge of each side edge 5 of the wear element 1 protrudes inwardly into the groove 4. Furthermore, each groove 4 has an inclined side 7 opposite the protruding part 6. A lower side 8 of a central part of each wear element 1 is placed at a somewhat lower level than a lower side 9 of respective side edge 5 of the wear element 1.

Figure 2:
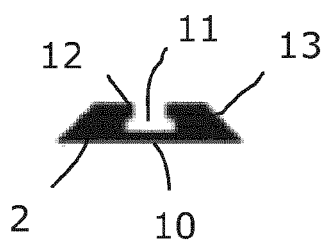
FIG. 2 is an end view of a first embodiment of a support rail, to be used with the wear element of FIG. 1.
Figure 3:
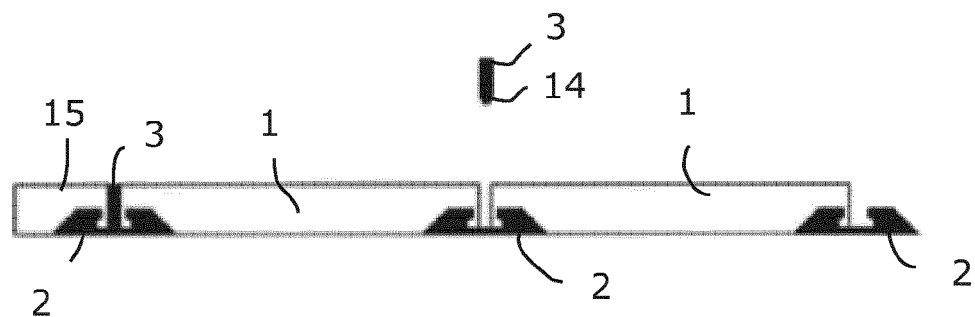
FIG. 3 is a side view illustrating mounting of the wear element of FIG. 1.

In FIG. 2 a support rail 2 according to a first embodiment is shown. The support rail 2 has a lower side 10, which lower side 10 is to be fixed to rock, stone and gravel handling equipment, such as a crusher, screen, feeder, hopper, chute etc. The support rail 2 may be fixed to the equipment in many different ways, for instance by means of adhesive tape, glue, welding or fastening means such as bolts. The support rails 2 are elongated. Each support rail 2 has a groove 11 open upwards. At the upper end of the groove 11 two protruding parts 12 are placed directed towards each other in such a way that the groove 11 opens between said protruding parts 12. Each support rail 2 has two opposed, inclined outer sides 13. In each groove 11 of each support rail 2, side edges 5 of two adjacent wear elements 1 are to be received. The shapes of the grooves 4 of the wear elements 1 and the grooves 11 of the support rails 2 are adapted to each other. The adaptation is such that the protruding parts 12 of the support rails 2 will be placed above the protruding parts 6 at the side edges 5 of the wear elements 1. Furthermore, the inclined outer sides 13 of the support rails 2 are to abut the inclined sides 7 of the grooves 4 of the wear elements 1. The difference in level between the lower side 8 of the central part of each wear element 1 and the lower side 9 of the side edges 5 of each wear element corresponds with the thickness of each support rail 2 at the bottom of the groove 11 of the support rail 2.

When the side edges 5 of two adjacent wear elements 1 are received in a groove 11 of a support rail 2 there is a gap between the wear elements 1. To securely fasten the wear elements 1 to the support rail 2, a wedge element 3 is pressed down between the wear elements 1 inside the groove 11 of the support rail 2. The wedge element 3 has a pointed lower edge 14 to facilitate insertion of the wedge element 3 between the wear elements 1.

At outer, opposed sides of an installed set of wear elements 1, end parts 15 may be placed. Each end part 15 has a groove corresponding with one of the grooves 4 of the wear elements 1 at only one side edge. The opposite side edge of the end part 15 has a shape that may be adapted to an adjacent part of the equipment receiving the set of wear elements 1. In FIG. 4 a set of wear elements 1 and end parts 15 are shown in a mounted position.

The wear elements 1 of the first embodiment are made of a relatively elastic material or at least the parts of the wear elements 1 having the grooves 4 are of a relatively elastic material. In mounting the wear elements 1 are simply pressed down onto the support rails 2, fastened to the equipment. When the wear elements 1 are pressed down onto the support rails the side edges 5 will flex and the protruding parts 6 of the side edges 5 will be placed below the protruding parts 12 of the support rails 2. In the final mounting step a wedge element 3 is pressed down between the wear elements 1 in each support rail 2. Often a hammer or mallet is used to press down the wedge element 3. The width of the wedge element 3 is such that it will be received with a close fit between the wear elements 1 or between a wear element 1 and an end part 15 inside respective support rail 2. Thus, the wear elements 1 are fasten in the support rails 2 by means of the wedge elements 3 and the co-operating grooves 4, 11 of the wear elements 1 and support rails 2, respectively.

If a separate wear element 1 is to be replaced, the wedge elements 3 at the opposite ends of the wear element 1 are lifted. The old wear element 1 is then lifted and a new wear element 1 is pressed down onto the support rails 2. Finally, the wedge elements 3 are pressed down in between the wear elements 1 in each support rail 2 at respective end of the new wear element 1.

In FIG. 5 second embodiments of wear elements 16 and support rails 17 are shown. In FIG. 5 also wedge elements 18 are shown, which wedge elements 18 correspond with the previously described wedge elements 3. Thus, each wedge element 18 has a pointed lower edge 25.

At opposite side edges 19 of each wear element 16 an inclined slit 20 is placed. The slits 20 incline in the same direction and are open downwards. In a corresponding way as described above, a lower side 22 of each side edge 19 is placed at a somewhat higher level than a lower side 21 of a central part of each wear element 16. The difference in level between the lower sides 22, 21 of the side edges 19 and central part, respectively, correspond with the thickness of a central part 23 of the support rails 17. Each support rail 17 is elongated and its central part 23 is flat. Two inclined sides 24 projects at opposite sides from the central part 23 of the support rail 17. The inclined sides 24 of the support rail 17 incline in the same direction and have an inclination corresponding with the inclinations of the inclined slits 20 of each wear element 16. In the same way as described for the embodiment of FIGS. 1 to 4, there are end parts 26 to be placed at the ends of a set of wear elements 16. The end parts 26 are identical and are only turned differently depending on which end a specific end part 26 is to be placed. However, at one end of the set of wear elements 16 a support rail 27 having another shape is used. The difference being that inclined sides of the support rail 27 incline in opposite directions. By using one support rail 27 in which the inclined sides are inclined toward each other identical end parts 26 may be used.

The embodiments of FIGS. 5 to 7 are mainly developed for wear elements 16 of relatively stiff or hard material. Examples of such stiff materials may be different polymeric or metallic materials. For wear elements 16 of stiff material the inclined slits 20 of the wear elements 16 are normally somewhat broader than the inclined sides 24 of the support rails 17, 27, to facilitate mounting of the wear elements. After placing the wear elements 16 on the support rails 17, 27, there will be a small gap between each inclined side 24 and the wear element 16 inside the slits 20 of respective wear element 16. In mounting, the central part 23 of each support rail 17, 27 is first fastened to a wall or the like of the equipment, for instance by means of an adhesive tape, glue, weld or fastening means. The support rails 17, 27 are fastened to the equipment with the inclined sides 24 projecting away from the equipment. Then wear elements 16 and end parts 26 are pushed down on the support rails 17, 27, whereby each of the inclined sides 24 of the support rails 17, 27 are received inside the slits 20 of the wear elements 16 and the end parts 26, respectively. A wedge element 18 is pressed down between two wear elements 16 or between an end part 26 and a wear element 16 inside each support rail 17, 27. In the support rail 27 having a slightly different shape, an end part 26 is pushed down on the inclined side of the support rail 27 having a different inclination than the inclined sides of the rest of the support rails 17 and a wear element 16 is pushed down on the other inclined side of the support rail 27. Then a wedge element 16 is pressed down between the wear element 16 and the end part 26 received in the support rail 27 having sides with different directions of inclination. The width of the wedge elements 18 is such that they will be received between the wear elements 16 or a wear element 16 and an end part 26 with a close fit inside each support rail 17, 27. Often a hammer or mallet is used to push down each wedge element 18.

In FIGS. 8 to 11 a further embodiment of the present invention is shown. This embodiment has much in common with the embodiment of FIGS. 5 to 7 and parts corresponding with parts of the previous embodiment described above will not be discussed extensively below.

Also in the embodiment of FIGS. 8 to 11 there are wear elements 28, support rails 29 and wedge elements 30. The main difference for this embodiment is that the inclined sides of the support rails are replaced by a number of inclined lugs 31. The inclined lugs 31 are placed at opposite sides of a central part 32 of each support rail 29. On each of said opposite sides a number of lugs 31 are placed at a distance from each other in a straight row. The inclination of the lugs 31 is the same as for the inclination of inclining slits of the wear elements 28. By means of the lugs 31 it is possible to place an additional layer 33 between the wear elements 28 and the equipment receiving a set of wear elements 28. The additional layer 33 has a number of openings 34 placed to receive the lugs 31 of the support rail 29. The additional layer 33 may have the same size as the wear elements 28 or may be of a different size. The additional layer 33 may for instance be used as a silencer, to reduce noise, and a further example is as energy-absorbing material, for instance to absorb impacts. The wear elements 28 have side edges having lower sides placed at a different height than lower sides of central parts of the wear elements 28. Said different heights correspond with the thickness of the central part 32 of each support rail 29. In the same way as for the previous embodiments there are end parts 35. The end parts 35 are identical and may be placed at either end of a set of wear elements 28. The width of the end parts 35 may be adapted to the equipment receiving the set of wear elements 28. At one end a modified support rail 38 is placed, which modified support rail 38 has lugs inclined in different directions on respective side of the central part of the support rail 38. The installation of the set of wear elements 28 of this embodiment corresponds with the installation described above for the previous embodiments, but in this embodiment the additional layers 33 are placed on the support rails 29, 36 before the wear elements 28 are mounted.

It is also possible to form the sides of the wear elements of the support rail of the first embodiment with lugs.

Figure 12:
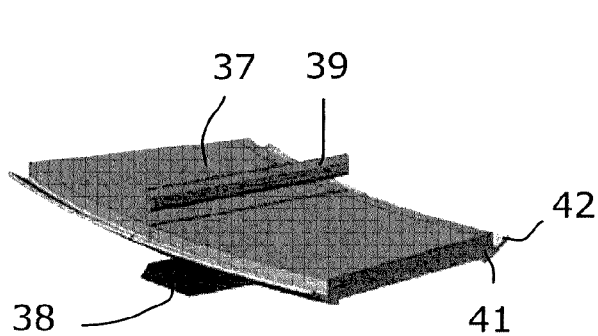
FIG. 12 is a perspective view illustrating mounting of a fourth embodiment of wear elements.
Figure 13:
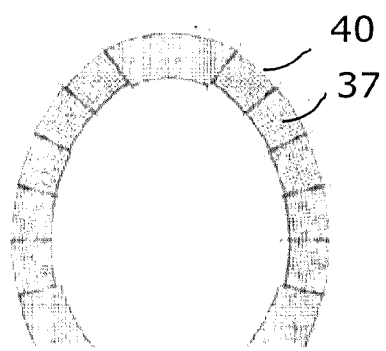
FIG. 13 is a schematic view of wear elements of the fourth embodiment of FIG. 12 as installed in a crusher.

In FIG. 12 a further embodiment for a wear element 37 is shown. In the same way as for the embodiment of FIGS. 1 to 4 the wear elements 37 are installed by means of support rails 38 and wedge elements 39. The support rails 38 are fastened to the equipment in the same way as previously described, for instance by means of adhesive tape, glue, welding or fastening means such as bolts. The wear elements 37 of this embodiment differ from the previously described wear elements in that each wear element 37 has a flange 40 at opposing sides. The flanges 40 are placed on the sides of each wear element 37 being generally perpendicular to the wedge elements 39 after installation and extend the total length of the wear element 37. The flanges 40 have one part 41 fastened to the wear element 37 and one part 42 projecting upwards and outwards from a lower edge of each flange 40. At least the part 42 of the flange 40 projecting upwards and outwards is made of an elastic material. The purpose of the flange 40 is mainly to take up any irregularities in an adjacent surface of the equipment. In FIG. 13 a set of wear elements 37 are shown as they might be placed in a crusher. All of the wear elements 37 as shown have a more or less curved form. The wear elements 37 are normally placed on an inclined surface inside the crusher.

For all of the above described embodiments it is possible to replace a separate wear element 1, 16, 58, 37 with a new wear element anywhere in the wear element system. The replacement is done in all embodiments in a way corresponding with the way described above for the first embodiment of FIGS. 1 to 4. Thus, by removing the wedge elements 3, 18, 30, 39 at opposite ends of a wear element 1, 16, 58, 37, that wear element may easily be replaced.

The invention claimed is:

1. A wear element system for equipment handling rocks, stones and gravel, comprising:
    a plurality of wear elements received in support rails, wherein the support rails are configured to be fastened to surfaces of the equipment;
    side edges of two adjacent wear elements received in one of the support rails, wherein the wear elements and support rails are formed to fasten the wear elements in the support rails; and
    wedge elements pushed down between the wear elements inside the support rails to fasten the wear elements in the support rails.

2. The wear element system of claim 1, wherein the wedge element and the wear elements have a close fit inside the support rail.

3. The wear element system of claim 1, further comprising end parts are placed at opposite sides of a set of wear elements, wherein each end part is received in a support rail together with an adjacent wear element and wherein a wedge element is pushed down between the end part and the adjacent wear element inside the support rail.

4. The wear element system of claim 1, wherein side edges of the wear elements have protruding parts placed below protruding parts of a groove of the support rails after mounting of the wear elements and wherein the side edges of two adjacent wear elements are placed inside the groove of each support rail.

5. The wear element system of claim 4, wherein inclined sides at the side edges of the wear elements abut inclined outer sides of the support rails after mounting of the wear elements.

6. The wear element system of claim 4, wherein the wear elements are made of an elastic material.

7. The wear element system of claim 1, wherein the support rails have a central part and inclined sides projecting from opposite sides of the central part, the inclined sides being received in inclined slits of the wear elements.

8. The wear element system of claim 7, wherein the inclined sides of all but one support rail incline in the same direction and wherein the inclined sides of one support rail inclines in opposite directions.

9. The wear element system of claim 7, wherein the wear elements are made of a stiff material.

10. The wear element system of claim 1, wherein each support rail has a central part and a number of inclined lugs projecting from opposite sides of the central part.

11. The wear element system of claim 10, wherein a layer having a number of openings are placed on the support rails with the lugs of the support rails received in the openings of the layer.

12. The wear element system of claim 11, wherein the layer is a silencer.

13. The wear element system of claim 1, wherein each wear element has flanges at two opposite sides of the wear element and wherein each flange has a part projecting upwards and outwards from a lower edge of the flange.

14. The wear element system of claim 1, wherein each wear element has a flat upper side, wherein a thickness of the wear element is bigger in a central part than at the side edges of each wear element and wherein the difference in thickness between the central part and the side edges of each wear element corresponds with a thickness of the central part of each support rail.

15. The wear element system of claim 1, wherein the support rails are fastened to the equipment by fastening means selected from the group of adhesive tape, glue, welding or bolts.

16. The wear element system of claim 1, wherein the equipment is selected from the group of a crusher, screen feeder, hopper or chute.

\* \* \* \* \*